(12) United States Patent
Gopalan (10) Patent No.: US 10,977,565 B2
(45) Date of Patent: Apr. 13, 2021

(54) BRIDGING HETEROGENEOUS DOMAINS WITH PARALLEL TRANSPORT AND SPARSE CODING FOR MACHINE LEARNING MODELS

(71) Applicant: AT&T Intellectual Property I, L.P., Atlanta, GA (US)

(72) Inventor: Raghuraman Gopalan, Dublin, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 985 days.

(21) Appl. No.: 15/582,192

(22) Filed: Apr. 28, 2017

(65) Prior Publication Data
US 2018/0314982 A1 Nov. 1, 2018

(51) Int. Cl.
G06N 5/04 (2006.01)
G06N 20/00 (2019.01)
G06N 20/10 (2019.01)

(52) U.S. Cl.
CPC .............. G06N 5/04 (2013.01); G06N 20/00 (2019.01); G06N 20/10 (2019.01)

(58) Field of Classification Search
None
See application file for complete search history.

(56) References Cited

U.S. PATENT DOCUMENTS

| | | | |
|---|---|---|---|
| 6,957,214 B2 | 10/2005 | Silberberg et al. | |
| 7,251,693 B2 | 7/2007 | Stull et al. | |
| 7,689,630 B1 | 3/2010 | Lam | |
| 7,702,625 B2 | 4/2010 | Peterson et al. | |
| 7,810,025 B2 | 10/2010 | Blair et al. | |
| 8,032,405 B2 | 10/2011 | Gilbert | |
| 8,412,746 B2 | 4/2013 | Fox et al. | |
| 8,577,927 B2 | 11/2013 | Fabret et al. | |
| 8,589,444 B2 | 11/2013 | Alcorn et al. | |

(Continued)

FOREIGN PATENT DOCUMENTS

| | | |
|---|---|---|
| AU | 2005203341 A1 | 3/2006 |
| WO | 2004077215 A2 | 5/2005 |

OTHER PUBLICATIONS

Jhuo et al. (Robust visual domain adaptation with low-rank reconstruction, Jul. 2012, pp. 2168-2175) (Year: 2012).*

(Continued)

Primary Examiner — George Giroux (57) ABSTRACT

A processor may generate initial subspaces by reducing data of a plurality of domains to a same dimensionality, cluster data within each initial subspace into clusters, create an input data matrix by projecting data from each cluster to an associated one of a plurality of generative subspaces associated with the plurality of clusters, perform a parallel transport between first and second sets of generative subspaces to identify a set of directions between pairs of subspaces of the first and second sets, sample points comprising a plurality of intermediate representations along the directions via an exponential mapping, create an expanded set of prior information by projecting the data from the first and second sets to the plurality of intermediate representations, perform a sparse coding with the input data matrix and the expanded set of prior information, and perform a cross domain inference using the output of the sparse coding.

20 Claims, 3 Drawing Sheets

(56) References Cited

U.S. PATENT DOCUMENTS

| | | |
|---|---|---|
| 8,589,798 B2 | 11/2013 | Prahlad et al. |
| 8,732,472 B2 | 5/2014 | Grebennikov et al. |
| 8,756,191 B2 | 6/2014 | B'far et al. |
| 8,862,614 B2 | 10/2014 | Pradhan et al. |
| 9,053,184 B2 | 6/2015 | Gerard et al. |
| 9,165,034 B2 | 10/2015 | Edwards et al. |
| 9,292,623 B2 | 3/2016 | Walker |
| 9,348,880 B1 | 5/2016 | Kramer et al. |
| 9,405,632 B2 | 8/2016 | Prahlad et al. |
| 9,542,434 B2 | 1/2017 | Gomadam et al. |
| 9,569,506 B2 | 2/2017 | Ellis et al. |
| 9,569,725 B2 | 2/2017 | B'far et al. |
| 2006/0009963 A1* | 1/2006 | Gaussier ............ G06F 40/45 704/7 |
| 2009/0157756 A1 | 6/2009 | Sanvido |
| 2011/0166850 A1* | 7/2011 | Achtermann ........ G06K 9/6222 704/9 |
| 2011/0191277 A1 | 8/2011 | Agundez et al. |
| 2012/0114248 A1* | 5/2012 | Yang ............... G06F 16/5838 382/190 |
| 2013/0282761 A1 | 10/2013 | Tamm et al. |
| 2017/0060695 A1 | 3/2017 | Clare et al. |
| 2017/0068751 A1 | 3/2017 | Bulusu et al. |
| 2018/0005086 A1* | 1/2018 | Jain ................. G06K 9/6255 |

OTHER PUBLICATIONS

Chang Wang et al., "Heterogeneous domain adaptation using manifold alignment." IJCAI Proceedings—International Joint Conference on Artificial Intelligence. vol. 22, No. 1 (2011). 6 Pages. http://www-anw.cs.umass.edu/pubs/2011/wang_m_11a.pdf.

Joey Tianyi Zhou, et al. "Heterogeneous Domain Adaptation for Multiple Classes." AISTATS. Apr. 22, 2014. pp. 1095-1103. http://www.jmlr.org/proceedings/papers/v33/zhou14.pdf.

Mehmet Gonen, "Embedding heterogeneous data by preserving multiple kernels." Proceedings of the Twenty-first European Conference on Artificial Intelligence. IOS Press, Aug. 18, 2014. pp. 381-386. https://pdfs.semanticscholar.org/e442/5c68a9abc0e5ee73a966a12b0cee2320248a.pdf.

Sriram Kumar et al., "Robust Domain Adaptation on the L1-Grassmannian Manifold." Proceedings of the IEEE Conference on Computer Vision and Pattern Recognition Workshops. Jun. 26, 2016. pp. 103-110. http://www.cv-foundation.org/openaccess/content_cvpr_2016_workshops/w23/papers/Kumar_Robust_Domain_Adaptation_CVPR_2016_paper.pdf.

* cited by examiner

BRIDGING HETEROGENEOUS DOMAINS WITH PARALLEL TRANSPORT AND SPARSE CODING FOR MACHINE LEARNING MODELS

The present disclosure relates generally to mapping data between heterogeneous domains, and more specifically to devices, computer-readable media, and methods for performing a cross domain inference using parallel transport and sparse coding.

BACKGROUND

At the core of big data applications and services are machine learning models that analyze large volumes of data to deliver various insights, key performance indicators, and other actionable information to the users of the applications and services. Designers may differentiate machine learning models, or machine learning algorithms (MLAs) for different big data applications involving video, speech, text, location information, images, network traffic data, and so forth. For example, different machine learning models (derived from corresponding MLAs) may include support vector machine (SVMs), e.g., binary classifiers and/or linear binary classifiers, multi-class classifiers, kernel-based SVMs, or the like, a distance-based classifier, a decision tree algorithm/model, a k-nearest neighbor (KNN) algorithm/model, and so on.

SUMMARY

In one example, the present disclosure provides a device, computer-readable medium, and method for performing a cross domain inference using parallel transport and sparse coding. For example, a processor may generate a plurality of initial subspaces by reducing data of each of a plurality of domains to a same dimensionality, cluster the data within each of the plurality of initial subspaces into a plurality of clusters, and create an input data matrix by projecting the data from each of the plurality of clusters to an associated one of a plurality of generative subspaces associated with the plurality of clusters. The processor may then perform a parallel transport between a first set of the plurality of generative subspaces and a second set of the plurality of generative subspaces to identify a set of directions between pairs of subspaces of the first set of the plurality of generative subspaces and subspaces of the second set of the plurality of generative subspaces, and sample a plurality of points comprising a plurality of intermediate representations along the set of directions via an exponential mapping. The processor may further create an expanded set of prior information by projecting the data from the first set of the plurality of generative subspaces and the second set of the plurality of generative subspaces to the plurality of intermediate representations, perform a sparse coding with the input data matrix and the expanded set of prior information, and perform a cross domain inference using an output of the sparse coding.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, non-transitory (i.e., tangible or physical) computer-readable storage media, and methods for performing a cross domain inference using parallel transport and sparse coding. Heterogeneous domain adaptation (HDA) addresses the problem of change in data characteristics across training (source domain) and testing (target domain) datasets. Various methods address the HDA problem by learning projections for each domain onto a common latent space where certain properties are satisfied, or by learning feature mapping from one domain onto another directly. In contrast, examples of the present disclosure "connect" different domains using a geometric technique, based on parallel transport on a Grassmann manifold, and then samples novel data representations that bridge the variance along the paths connecting domains. This results in a large data corpus which is then harnessed by a deep learning methodology (e.g., hierarchical sparse coding) to perform inference. The approach can accommodate both labeled (supervised) and unlabeled (unsupervised) data, and can perform zero-shot learning where inferences can be made even without example data for a category.

More specifically, given N domains, with each domain representing data with different feature types (thus having different dimensions), the data from each domain is grouped into k clusters based on feature similarity. Generative subspaces corresponding to each cluster are created via principal component analysis (PCA) on each cluster. In general, a subspace is a lower dimension representation of the information (data) as compared to the original feature dimensions. All generative subspaces are fixed to have the same dimensionality "p" using a heuristic tied to the amount of energy preserved in the PCA dimensionality reduction. Next, parallel transport is performed between generative subspaces in each domain pair to obtain several intermediate representations that describe how data across domains can be bridged. For example, each generative subspace is mapped onto a point on a Grassmann manifold. If there are three generative subspaces, then there are three corresponding points on the manifold. In one example, the geodesic is calculated between the mean of the generative subspaces for each domain. Then, in one example, an exponential mapping of the geodesic on the tangent plane is performed to obtain a sequence of parallel paths between all cross-domain pairs of points (i.e., generative subspace pairs) from the respective domains. The intermediate representations may then comprise sampled points form along the sequence of parallel paths. In one example, the data from each domain is then projected onto the respective intermediate representations to obtain an expanded set of prior information (or an "expanded prior"). Hierarchical sparse coding is then applied using the expanded set of prior information to obtain "sparse" codes or "compact" codes which may be used for cross domain inference, such as by training and deploying a classifier or other types of machine learning model.

Notably, examples of the present disclosure may accommodate unlabeled data since generative modeling is implemented in addressing the heterogeneous domain shift. When the source and target domains contain the same categories/classes, the final inference can range from a classification scenario, where labels exist for all categories in the source domain and the target domain may or may not have partial labels, to a clustering scenario where both the source and target domains are unlabeled. For instance, label information may be utilized while training a discriminative classifier such as a support vector machine (SVM) on the learnt sparse codes, and if no labels are available, clustering may be applied on the sparse codes, such as k-means clustering and the like. Examples of the present disclosure also address a "zero-shot" scenario in which there are categories in the target domain that are not present in the source domain. Since the present model is generative, the learned domain shift may include pertinent information for reasoning out new categories. In addition, examples of the present disclosure may accommodate multiple heterogeneous source domains and/or target domains, since the expanded set of prior information is obtained using parallel transport between each domain pair. This does not pose a computational bottleneck as hierarchical sparse coding learns sparse codes which are able to accommodate big data.

Examples of the present disclosures find application in: object recognition (e.g., recognizing images of objects acquired with different camera sources), text categorization (e.g., mapping text sources across different languages), sentiment analysis (e.g., ratings and product reviews across domains such as books, electronic gadgets, etc.), event classification (e.g., inferring video events across sports and surveillance data feeds), multi-modal biometric authentication (e.g., with faces, voice, iris, and fingerprints as different domains), targeted advertising with feeds from entertainment, sports and politics as different domains (which can be mapped to user preferences), software defined networking (e.g., with data sources corresponding to large-scale sports events and musical events), and so forth.

The following describes a technical approach according to one embodiment of the present of the present disclosure. First, it is assumed that there are N heterogeneous domains $D=\{D_i\}_{i=1}^{N}$, where each domain $D_i=\{x_i^j, y_i^j\}_{j=1}^{n_i}$ contains $n_i$ data samples with $x_i^j \in \mathbb{R}^{d_i}$ denoting the feature vector of dimension $d_i$ and $y_i^j$ denoting the corresponding label information (if any) belonging to one of M different categories. In various examples, the N domains could be partitioned into source and target domains, depending on the problem situation. With this information, one goal is to account for heterogeneous domain shift in inferring the labels of unlabeled target domain data.

Examples of the present disclosure create and utilize subspaces derived from the data of the various N domains. In general, there are multiple subspaces that are extracted from each domain. In the field of domain adaptation, a geodesic on the Grassmann manifold may be used as a bridge to connect a pair of subspaces. However, examples of the present disclosure bridge two "sets" of subspaces. In this regard, parallel transport is used to learn multiple paths by which subspace sets can be bridged. More specifically, let $S_1=\{S_1^i\}_i$ and $S_2=\{S_2^j\}_i$ denote two sets of p-dimensional subspaces in $\mathbb{R}^d$ corresponding to domains $D_1$ and $D_2$ respectively, where each subspace (e.g., $S_1^1$) is a point on the Grassmannian $G_{d,p}$. Let $g_A(t)$ denote the geodesic with the initial direction $A \in \mathbb{R}^{(d-p) \times p}$ connecting the means of $S_1$ and $S_2$, and $\overline{S}_1^1$ denote the tangent space representation of $S_1^1$ obtained using inverse exponential mapping computed at the mean of $S_1$. The parallel transport of $\overline{S}_1^1$ is then given as:

$$\gamma_{\overline{S}_1^1}(t) = Q_{S_1^1} \exp\left(t \begin{bmatrix} 0 & A^T \\ -A & 0 \end{bmatrix}\right) \begin{bmatrix} 0 \\ B \end{bmatrix} \quad \text{Equation 1}$$

In Equation 1, exp is the matrix exponential, $Q_{S_1^1} \in SO(d)$ is the orthogonal completion of $S_1^1$, and $B \in \mathbb{R}^{(d-p) \times p}$ is the initial direction to reach from $S_1^1$ to the exponential map of $\overline{S}_1^1$. Similar directions can be obtained for all subspaces in the sets $S_1$ and $S_2$ using the above tangent space approximation.

Sparse coding represents each input vector $x \in \mathbb{R}^p$ as a sparse linear combination of basis vectors. Given a stacked input data matrix $X \in \mathbb{R}^{p \times n}$, where n is the number of data, a sparse coding may seek to minimize:

$$\underset{Z \in \mathcal{Z}, C}{\arg\min} \|X - ZC\|_2^2 + \lambda \Omega(C) \quad \text{Equation 2}$$

In Equation 2, $Z \in \mathbb{R}^{p \times r}$ is the dictionary of basis vectors, $\mathcal{Z}$ is the set of matrices whose columns have small $\ell_2$ norm and $C \in \mathbb{R}^{r \times n}$ is the code matrix, $\lambda$ is a regularization hyperparameter, and $\Omega$ is the regularizer. In hierarchical sparse coding, such a scheme is extended in a layered fashion using a combination of coding and pooling steps.

In accordance with the present disclosure, an example process for performing a cross domain inference using parallel transport and sparse coding may proceed as follows. In one example, data from all N domains, $D=\{D_i\}_{i=1}^{N}$, are first brought to a common dimensionality "d" by performing PCA on each Di. In one example, the resultant subspace dimensionality is selected as the largest number of dimensions required among all N subspaces such that a threshold percentage of signal energy is preserved for the decomposition, e.g., 90 percent. In one example, the threshold may range anywhere from 50 to 99 percent. In addition, in one example data from each domain is then projected onto its corresponding subspace. The result is d-dimensional data across all domains (e.g., $\overline{X}=\{\overline{x}_i^j\}_{i,j}$ where i ranges from 1 to N and j ranges from 1 to $n_j$).

Next, for each domain $D_i$, k generative subspaces are created by partitioning $\{\overline{x}_i^j\}_{j=1}^{n_i}$ into k clusters, e.g., using a k-means algorithm, based on the similarity of the d-dimensional features, and performing PCA on each cluster. In one example, all of the generative subspaces are brought to the same dimensionality p. For instance, in one example, p is selected as the largest number of dimensions required for a generative subspace, amongst all generative subspaces obtained through clustering in each of the N domains, such that 90 percent of the signal energy is preserved by that decomposition. In one example, the threshold may range anywhere from 50 to 99 percent. Thus each domain $D_i$ may have a resulting set of p-dimensional generative subspaces in $\mathbb{R}^d$ denoted by $S_i=\{S_i^j\}_{i=1}^{k}$. Each generative subspace in a set is a point on the Grassmann manifold (or "Grassmannian") $G_{d,p}$. Let $$X \in \mathbb{R}^{p \times n}, n = \sum_{i=1}^{N} n_i$$

denote the matrix containing the projections of each data $\overline{X}$ onto its appropriate subspace in $S=\{S_i\}_{i=1}^N$. In one example, the matrix X may comprise an input data matrix for sparse coding, as described in greater detail below.

In one example, parallel transport is then performed between the generative subspaces to obtain a collection of directions between each pair of $(S_i, S_j)$, i=1, ..., N-1, j=i+1, ..., N. In addition, in one example, points are sampled along these directions which results in new subspaces (e.g., "intermediate representations") that contain information on how domain shift information flows between domains. In one example, the sampling may be uniform along these directions. In addition, in one example, the mapping may comprise an exponential mapping. Thereafter, data $\overline{X}$ may be projected onto these intermediate representations, resulting in an expanded set of prior information, or "expanded prior", $P \in \mathbb{R}^{p \times r}$. In one example, the expanded prior is used to initialize a dictionary Z for sparse coding, e.g., hierarchical sparse coding.

In one example, sparse coding is implemented with the input data matrix X and the initial dictionary Z. In one example, hierarchical sparse coding is utilized. In such an example, at the output of each layer of hierarchical sparse coding, another expanded set of prior information (or "expanded prior") is generated, which is then used to complement the dictionary of the following layer. In one example, the final output (e.g., from the last layer of hierarchical sparse coding) may be denoted by $\hat{X}=\{\hat{x}_i^j\}_{i,j}$, corresponding to the data in X. Label information, if any, may be denoted by $Y=\{y_i^j\}_{i,j}$. However, it should be noted that the above described example does not utilize label information at any step up to this point.

Lastly, cross domain inferences may be made using the information contained in $W=(\hat{X}, Y)$. Notably, W contains data from both source and target domain(s). In addition, it should again be noted that depending on the dataset, there may be one or more source domains and/or target domains. The cross domain inferences may take various forms. For instance, in one example, the cross domain inference may comprise a classification. For example, a source domain (or source domains) may contain labeled data for all M categories. The target domain(s) may have full or partial labels, or may be unlabeled. In addition, both the source and target domain(s) may have the same M categories. In such an example, the labeled data present in W may be used to train a multi-class classifier (e.g., a multi-class SVM) with default parameters for linear kernel. Accordingly, the classifier may then be used on a stream of new data from the target domain(s) to determine a similarity score and classify the unlabeled target domain data into one of M categories. In one example, classification accuracy may be computed as the percentage of unlabeled target data that is correctly assigned a category label (e.g., using ground truth).

In one example, the cross domain inference may alternatively or additionally comprise clustering, e.g., where both source and target domain data have the same M categories, but where the data is unlabeled. In this case, the data in $\hat{X}$ may be clustered into M groups, e.g., using a clustering algorithm, such as k-means clustering. In one example, a clustering accuracy may be calculated and optimized by labeling each of the resulting clusters with the majority class label according to the ground truth, and measuring the number of mis-classifications made by each cluster grouping. In other words, the clusters may then be used for a classifier, e.g., as described above.

In still another example, the cross domain inference may be associated with a zero-shot learning scenario where the target domain(s) has/have some categories that are not a part of the M source domain categories. In this case, labels for M categories in the source domain(s) and (if available) in the target domain(s) may be used to train a classifier, e.g., as described above. A threshold may be applied to a similarity score for the unlabeled target data may, where if the target data comes outside of the M source categories, the similarity score will be below the threshold similarity score. The data may then be clustered, e.g., using k-means clustering or the like, to obtain clusters/grouping. In one example, the number of clusters is set to a number of new target categories known in advance. In addition, in one example, the accuracy may be determined in a similar manner as described above in connection with the clustering scenario.

The cross domain inference may relate to various types of data, or "domains," such as performing object recognition (e.g., a classification scenario) using image sources, such as webcam (low resolution) images, product images taken from a merchant website, and digital signal lens reflex (DSLR) (e.g., high resolution) images, as source and target domains. For instance, the first two categories may be used as source domains, and the latter category may comprise a target domain. Samples from each category may be used to generate an expanded set of prior information and an input data matrix to which a sparse coding process is applied to generate a corpus of information. A subset of labeled images from the first two sources may then be selected to train a classifier in accordance with the corpus of information. In addition, if label information is available for the target domain, a subset of the samples may be also utilized to train the classifier, while the remaining data of the target domain may be used as test data.

In another example, the cross-domain inferences may relate to text categorization, e.g., to identify topics/subjects in news articles, where the source and target domains may comprise articles in different languages. In one example, each domain may have approximately 1000 dimensions (which are not necessarily the same from domain to domain). As in the previous example, a subset of labeled documents from the source domains may be selected to train a classifier in accordance with the corpus of information. If label information is available for the target domain, a subset of the samples may be also utilized to train the classifier, while the remaining data of the target domain may be used as test data.

In another example, the cross-domain inferences may relate to sentiment analysis, e.g., customers' rankings/ratings of products, where source and target domains may include reviews in different languages, and where the inferences may comprise inferring/classifying a sentiment for a product review in the target domain that was not in a training data set. In still another example, the cross-domain inferences may relate to event classification where, for example, source and target domains may include images and videos of events such as birthdays, picnics, parades, sports, weddings, etc., corresponding to categories to be learned.

In one example, various parameters for a process of performing a cross domain inference using parallel transport and sparse coding in accordance with the present disclosure may be selected, tuned, and/or optimized based on various criteria. For instance, parameters may be empirically determined to improve an accuracy of cross domain inference. In another example, the parameters be selected to optimize a processing time for performing a cross domain inference. The parameters may include: a number of clusters, PCA threshold(s), a number of samples per parallel transport direction, and a number of layers for sparse coding (e.g., hierarchical sparse coding). For instance, 10 samples per parallel transport direction were utilized in one experiment in accordance with the present disclosure. However, 8 and 12 samples per direction were also utilized in other experiments. In one example a number of clusters was set to 8, 10, and 12 in various experiments. Similarly, in one example, PCA thresholds for generative subspaces were set to 80 percent and 85 percent, respectively. In each of the above scenarios, there was a minimal decline in inference accuracy from one experiment to the next, e.g., at most a two percent decline. In another example, the number of layers of sparse coding was varied with improvements plateauing at three layers, and with performance reductions of 8 percent and 17 percent at two layers and one layer, respectively. In addition, a corpus of information and machine learning model may be generated in representative applications in approximately 5 to 10 seconds on a 2 GHz machine, in accordance with the above parameters. However, in various scenarios, more or less time may be tolerated, leading to different selections of the number of samples, different PCA thresholds, a different number of clusters, and so forth. Similarly, changes in these parameters may result in declines in classification accuracy which may cause a designer, or a processor, computing device, or the like to select greater (or lesser) values for such parameters.

As mentioned above, examples of the present disclosure may operate in the absence of label information, or may generate a corpus of information without utilizing label information, even if available. However, in another example, label information may be used prior to generating the corpus of information. For instance, label information may be used to perform discriminative hierarchical sparse coding to generate the corpus of information. Thus, in addition to minimizing the reconstruction error of the data samples, the sparse codes output $\hat{X}$ also separates samples belonging to one class from other classes. Alternatively, or in addition, label information may be used in forming the clusters associated with each domain. For instance, instead of using the similarity of the d-dimensional features to group the data into k clusters, the data may be grouped/clustered using the labels into M clusters, with the remaining steps performed as outlined above. In such an example, the parallel transport information includes a notion of class discrimination in traversing the domain shift. In addition, the inferences (e.g., classification) may be improved by up to 15-20 percent or more by using label information in one or both of these ways. These and other aspects of the present disclosure are discussed in greater detail below in connection with the examples of FIGS. 1-3.

Figure 1:
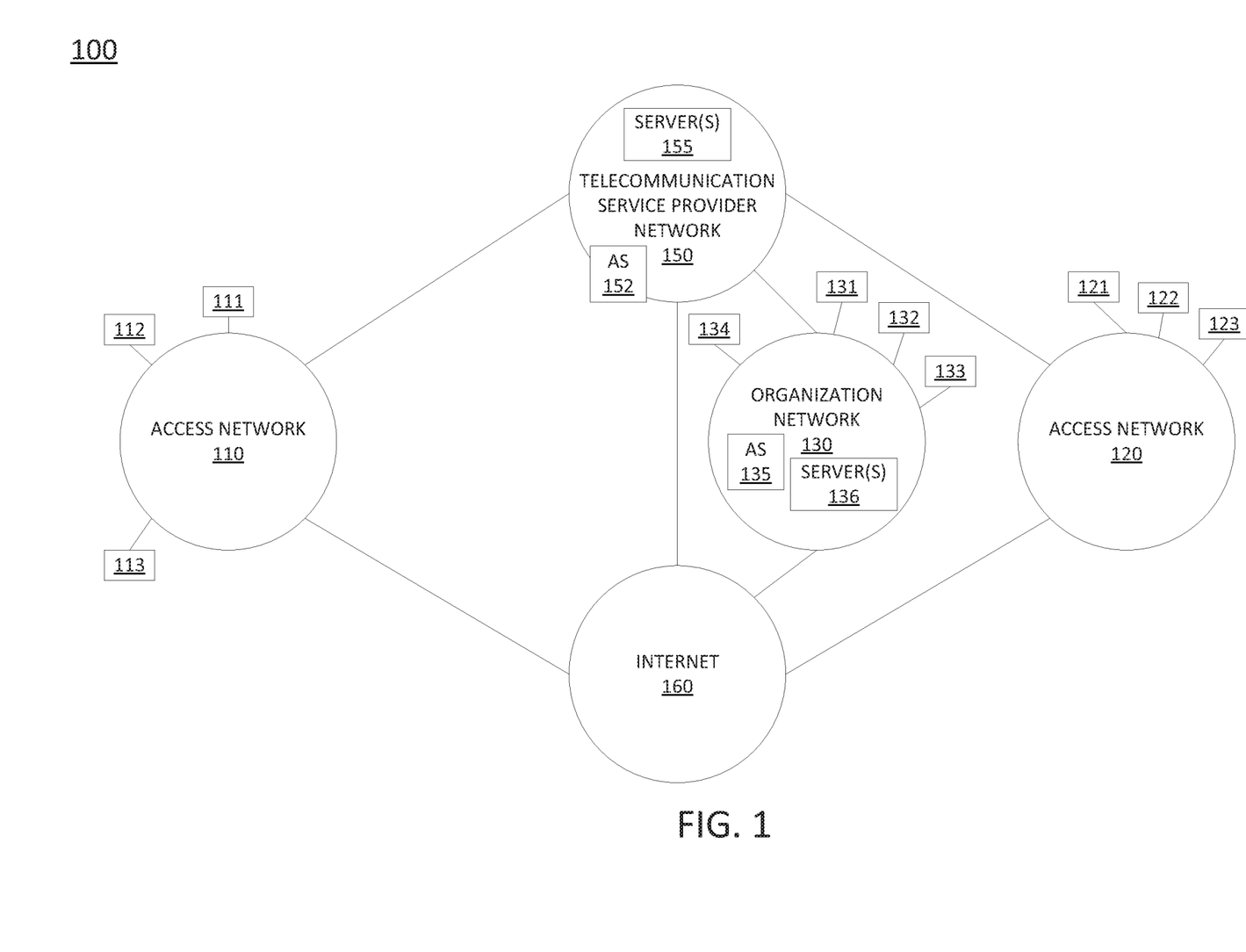
FIG. 1 illustrates one example of a system including a telecommunication service provider network, according to the present disclosure.

To aid in understanding the present disclosure, FIG. 1 illustrates an example system 100 comprising a plurality of different networks in which examples of the present disclosure for performing a cross domain inference using parallel transport and sparse coding may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office. In one example, telecommunication service provider network 150 may also include an application server (AS) 152 and one or more servers 155, as described in greater detail below. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113 and 121-123, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of access networks 110 and 120 may comprise an Internet service provider (ISP) network, a cable access network, and so forth. In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network 130 functions, e.g., of a public land mobile network (PLMN)-universal mobile telecommunications system (UMTS)/General Packet Radio Service (GPRS) core network, or the like. In still another example, access networks 110 and 120 may each comprise a home network, which may include a home gateway, which receives data associated with different types of media, e.g., television, phone, and Internet, and separates these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs) and/or home networks, and the like.

In one example, the organization network 130 may comprise a local area network (LAN), or a distributed network connected through permanent virtual circuits (PVCs), virtual private networks (VPNs), and the like for providing data and voice communications. In one example, the organization network 130 links one or more endpoint devices 131-134 with each other and with Internet 160, telecommunication service provider network 150, devices accessible via such other networks, such as endpoint devices 111-113 and 121-123, and so forth. In one example, endpoint devices 131-134 comprise devices of organizational agents, such as customer service agents, or other employees or representatives who are tasked with addressing customer-facing issues on behalf of the organization that provides organization network 130. In one example, endpoint devices 131-134 may each comprise a telephone for analog or digital telephony, a mobile device, a cellular smart phone, a laptop, a tablet computer, a desktop computer, a bank or cluster of such devices, and the like.

In one example, the organization network 130 may be associated with the telecommunication service provider network 150. For example, the organization may comprise the telecommunication service provider, where the organization network 130 comprises devices and components to support customer service representatives, and other employees or agents performing customer-facing functions. For instance, endpoint devices 111-113 and 121-123 may comprise devices of customers, who may also be subscribers in this context. In one example, the customers may call via a telephone or engage in text or multi-media based chat conversations via endpoint devices 111-113 and 121-123 with customer service representatives using endpoint devices 131-134.

In one example, the organization network 130 may also include an application server (AS) 135. In one example, AS 135 may comprise a computing system, such as computing system 300 depicted in FIG. 3, and may be configured to provide one or more functions for performing a cross domain inference using parallel transport and sparse coding, in accordance with the present disclosure. Similarly, in one example, AS 152 in telecommunication service provider network 150 may comprise a computing system, such as computing system 300 depicted in FIG. 3, and may be configured to provide one or more functions for performing a cross domain inference using parallel transport and sparse coding, in accordance with the present disclosure. For example, AS 152 or AS 135 may be configured to perform one or more steps, functions, or operations in connection with the example method 200 described below. Thus, as described herein, functions of AS 152 may alternatively be performed by AS 135, and vice versa.

In addition, it should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

In one example, the system 100 may also include one or more servers 136 and/or one or more servers 155 in organization network 130 and telecommunication service provider network 150, respectively. In one example, the servers 136 and/or 155 may each comprise a computing system, such as computing system 300 depicted in FIG. 3, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. Other centralized system components may include, for example, a layer 3 router, a short message service (SMS) server, a voicemail server, a video-on-demand server, a server for network traffic analysis, and so forth. In addition, in accordance with the present disclosure, centralized system components may also include devices and/or servers for implementing machine learning models in accordance with the present disclosure for various services such as: traffic analysis, traffic shaping, firewall functions, malware detection, intrusion detection, customer churn prediction, content recommendation generation, and so forth. It should be noted that in one example, a centralized system component may be hosted on a single server, while in another example, a centralized system component may be hosted on multiple servers, e.g., in a distributed manner.

In general, the centralized system components may collect, aggregate, and/or store various types of data that may be used as training data for performing a cross domain inference using parallel transport and sparse coding in accordance with the present disclosure, such as: payload and/or header data of packets, frames, datagrams, or other protocol data units (PDUs), network signaling and traffic data, call detail records (CDRs) or session records, which may contain a device type identifier (e.g., the manufacturer, model, firmware version and other similar features which distinguish one device type from another), a cell identifier, which identifies the cell that serves the device (e.g., the serving base station), one or more application identifiers identifying the application(s) used in the session, and usage statistics for the session, such as a total number of bytes, total number of packets, and total number of flows during that session, and so on, customers' network service profile data, demographic data, and/or service usage data, mobile device location data, and various other types of data (broadly "network operation records"). Other types of data may include records generated by an interactive voice response (IVR) system of organization network 130 (e.g., one of the servers 136), call summary records entered by call center personnel of organization network 130, and so forth. Still other types of data may include audio, video, and or image data, e.g., for image, voice, or other pattern recognition, for gait analysis, and so on, or product and/or service reviews, and may comprise data that is transmitted via one or more networks and/or links of the system 100, and/or which is stored by one of the centralized system components, e.g., a database server, or cluster. In addition, in accordance with the present disclosure the data may include data of similar types but from different "domains." For instance, a first domain may comprise photographs captured with smartphone cameras, while a second domain may comprise photographs taken with digital single lens reflex (DSLR) cameras. In another example, a first domain may comprise facial photographs taken with a flash, while a second domain may comprise facial photographs taken without a flash. Similarly, a first domain may comprise daytime photographs, while a second domain may comprise nighttime photographs. In another example, a first domain may comprise network traffic from a 2G or a 3G radio access network, while a second domain may comprise network traffic from a 4G radio access network. In still another example, a first domain may comprise customer interaction data from an interactive voice response (IVR) system, while a second domain may comprise customer interaction data from a web-based/online customer service system.

In accordance with the present disclosure, in one example, AS 152 (and/or AS 135) may collect network operations records or other types of data from one or more centralized system components (e.g., servers 155 and/or servers 136). In one example, the data that is collected may relate to customers associated with endpoint devices 111-113 and 121-123, e.g., network traffic data for such customers, service profile data for such customers, and so forth. In one example, the centralized system components may forward data to AS 152 (and/or AS 135) on a periodic basis, when a certain quantity of data has been collected and is ready to be transmitted, etc. Alternatively, or in addition, AS 152 (and/or AS 135) may query the centralized system component(s), e.g., periodically or on some other basis, in order to retrieve the data. As described in greater detail below, AS 152 (and/or AS 135) may perform a cross domain inference using parallel transport and sparse coding. For instance, AS 152 (and/or AS 135) may create an input data matrix via clustering and principal component analysis over training data of a plurality of different domains, create an expanded set of prior information using parallel transport between generative subspaces associated with different source domains, and generate a corpus of information from the input data matrix and the expanded set of prior information, where the data corpus may be used for performing cross domain inferences in accordance with the present disclosure. AS 152 and/or AS 135 may also create machine learning models in accordance with the corpus of information for performing various types of cross domain inferences, such as by clustering unlabeled data in the corpus, and/or using label information from the original training data to train a support vector machine (SVM)-based classifier, e.g., a binary classifier and/or a linear binary classifier, a multi-class classifier, a kernel-based SVM, etc., a distance-based classifier, e.g., a Euclidean distance-based classifier, or the like, or a non-classifier type machine learning model, such as a decision tree, a k-nearest neighbor (KNN) predictive model, a neural network, and so forth. Alternatively, or in addition, AS 152 and/or AS 135 may implement various functions of one or more machine learning models, e.g., those created using a corpus of information as described above. For instance, AS 152 and/or AS 135 may perform one or more cross domain inferences in accordance with the present disclosure, such as object recognition, text classification, sentiment analysis, event classification, and so forth, with regard to a stream of new data. In addition, as referred to herein, a stream may comprise real-time data that is traversing a network or that is being generated by one or more devices, sensors, and so forth. A stream may also comprise a stored series of new data, such as a sequence of images, e.g., discrete images or frames in video, a batch of files, and the like.

Thus, in one example, AS 152 and/or AS 135 may perform one or more cross domain inferences in accordance with the present disclosure. However, in another example, a machine learning model that is generated in accordance with the present disclosure may be deployed at one or more of the centralized system components from which the data is gathered, or at one or more different centralized system components for performing one or more cross domain inferences. For instance, a centralized system component may comprise a router with a packet/stream filtering function that may utilize a machine learning model that is trained with a corpus of information generated in accordance with the present disclosure. In another example, a centralized system component may implement a speech recognition function that utilizes a machine learning model, e.g., a pattern search algorithm, on a stream of voice data to identify a speaker.

It should also be noted that in other, further, and different examples, variations of one or more of the above described operations may be implemented in accordance with the present disclosure. For example, a decision tree algorithm may be used instead of a SVM-based binary classifier. In another example, a binary KNN algorithm may be utilized. In still another example, a distance-based classifier may be used. For example, the machine learning algorithm may comprise a clustering algorithm over positive examples to generate a vector in a hyper-dimensional space representing the average of the positive examples. Thus, these and other modifications are all contemplated within the scope of the present disclosure. Various additional functions of AS 152 (and/or AS 135) in connection with performing a cross domain inference using parallel transport and sparse coding are described in greater detail below in connection with the example of FIG. 2. In addition, it should be realized that the system 100 may be implemented in a different form than that illustrated in FIG. 1, or may be expanded by including additional endpoint devices, access networks, network elements, application servers, etc. without altering the scope of the present disclosure.

Figure 2:
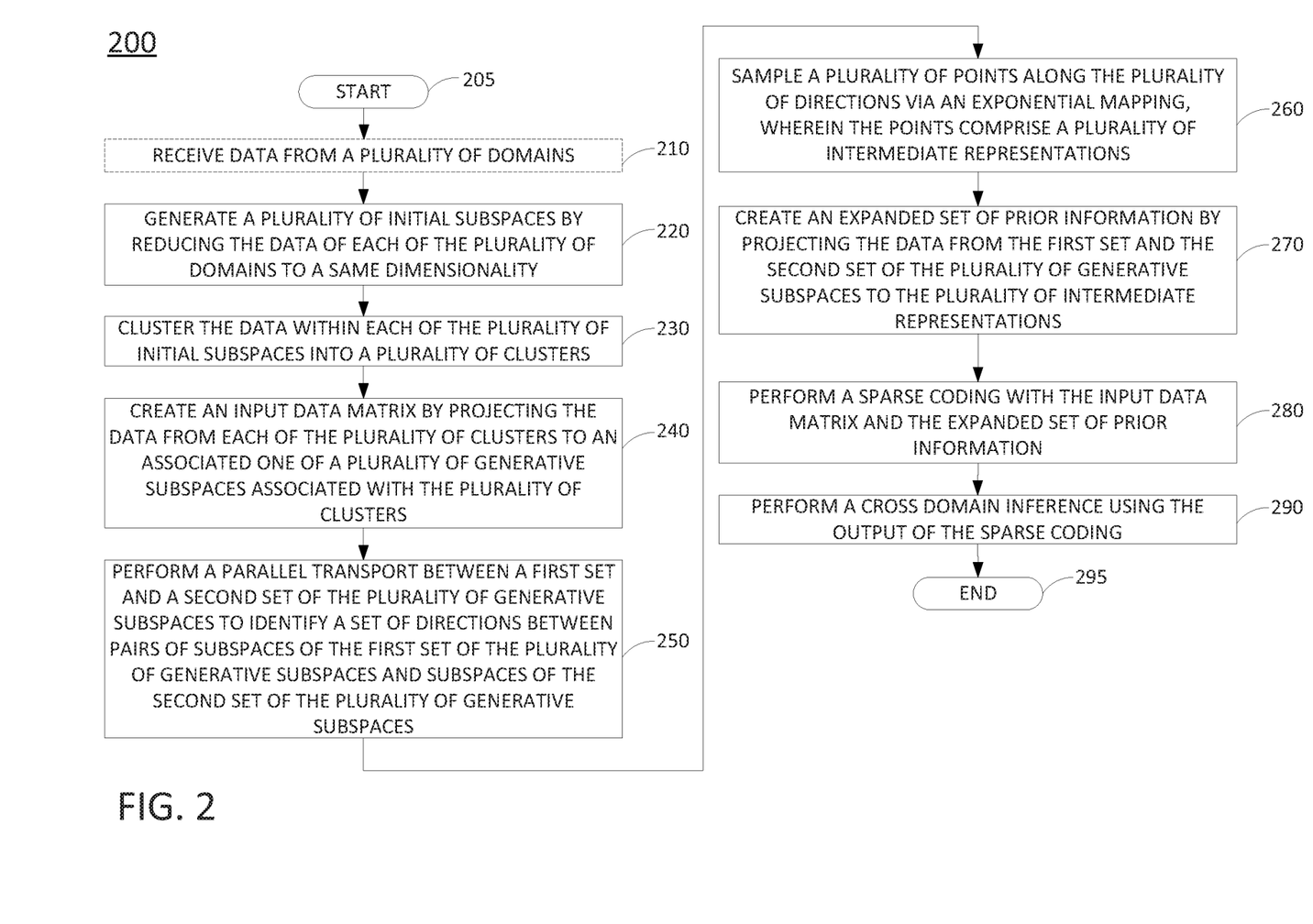
FIG. 2 illustrates a flowchart of an example method for performing a cross domain inference using parallel transport and sparse coding, in accordance with the present disclosure.

FIG. 2 illustrates an example flowchart of a method 200 for performing a cross domain inference using parallel transport and sparse coding, in accordance with the present disclosure. In one example, the steps, operations, or functions of the method 200 may be performed by any one or more of the components of the system 100 depicted in FIG. 1. For instance, in one example, the method 200 is performed by the application server 135 or application server 152, or by application server 135 or application server 152 in conjunction with other components of the system 100. Alternatively, or in addition, one or more steps, operations or functions of the method 200 may be implemented by a computing device having a processor, a memory and input/output devices as illustrated below in FIG. 3, specifically programmed to perform the steps, functions and/or operations of the method. Although any one of the elements in system 100 may be configured to perform various steps, operations or functions of the method 200, the method will now be described in terms of an example where steps or operations of the method are performed by a processor, such as processor 302 in FIG. 3.

The method 200 begins at step 205 and may proceed to optional step 210 or to step 220. At optional step 210, the processor may receive data from a plurality of domains. In one example, at least a first one of the plurality of domains comprises a source domain and at least a second one of the plurality of domains comprises a target domain. In one example, at least a portion of the data of one or more source domains includes label information. In addition, in one example, at least a portion of the data of one or more target domains may include label information.

At step 220, the processor generates a plurality of initial subspaces by reducing data of each of a plurality of domains to a same dimensionality. In one example, each of the initial subspaces is a "subspaces" of a full feature space of a respective domain (and of an overall feature space of the plurality of domains). In one example, the generating the plurality of initial subspaces comprises: performing a principal component analysis for each of the plurality of domains to generate the plurality of initial subspaces, and projecting the data from each of the plurality of domains to an associated one of the plurality of initial subspaces. In one example, the same dimensionality is selected as a largest dimensionality associated with the plurality of initial subspaces that preserves a threshold percentage of signal energy of the data of each of the plurality of domains. For instance, the threshold may comprise between 50 and 99 percent, e.g., 85 percent, 90 percent, etc.

At step 230, the processor clusters the data within each of the plurality of initial subspaces into a plurality of clusters. As mentioned above, in one example, at least a first one of the plurality of domains comprises a source domain with label information for the data of the source domain and at least a second one of the plurality of domains comprises a target domain. In one example, the clustering the data within each of the plurality of initial subspaces into the plurality of clusters utilizes the label information to differentiate the plurality of clusters. In one example, the clustering comprises a k-means clustering.

At step 240, the processor creates an input data matrix by projecting the data from each of the plurality of clusters to an associated one of a plurality of generative subspaces. In one example, the plurality of generative subspaces is generated via a principal component analysis over the plurality of clusters. For instance, the principal component analysis over the plurality of clusters may reduce the same dimensionality of the plurality of initial subspaces to a largest dimensionality associated with the plurality of initial subspaces that preserves a threshold percentage of signal energy of the data of each of the plurality of clusters. For instance, the threshold may comprise between 50 and 99 percent, e.g., 85 percent, 90 percent, etc.

At step 250, the processor performs a parallel transport between a first set of the plurality of generative subspaces and a second set of the plurality of generative subspaces. In one example, the performing of the parallel transport identifies a set of directions between pairs of subspaces of the first set of the plurality of generative subspaces and subspaces of the second set of the plurality of generative subspaces, e.g., along a Grassmann manifold. In one example, the first set of the plurality of generative subspaces is associated with at least two of the plurality of the domains. Similarly, in one example the second set of the plurality of generative subspaces is associated with at least two of the plurality of the domains. In still another example, both the first set of the plurality of generative subspaces and the second set of the plurality of generative subspaces are respectively associated with at least two of the plurality of the domains.

At step 260, the processor samples a plurality of points along the plurality of directions via an exponential mapping, wherein the points comprise a plurality of intermediate representations. For instance, intermediate representations may comprise additional "subspaces" of the overall feature space of the plurality of domains. In one example, the sampling the plurality of points along the plurality of directions comprises a uniform sampling.

At step 270, the processor creates an expanded set of prior information by projecting the data from the first set of the plurality of generative subspaces and the second set of the plurality of generative subspaces to the plurality of intermediate representations.

At step 280, the processor performs a sparse coding with the input data matrix and the expanded set of prior information. In one example, a dictionary for the sparse coding is initialized with the expanded set of prior information. As mentioned above, in one example, at least first of the plurality of domains comprises a source domain with label information for the data of the source domain and at least a second of the plurality of domains comprises a target domain. In such an example, the sparse coding may comprise a discriminative sparse coding using the label information for the data of the source domain(s) (and/or the label information for the data of the target domain(s)). In one example, the sparse coding comprises a hierarchical sparse coding, e.g., a three-layer hierarchical sparse coding.

At step 290, the processor performs a cross domain inference using the output of the sparse coding. For example, the performing the cross domain inference may comprise an object recognition, a text classification, a sentiment analysis, an event classification, and so forth. As mentioned above, in one example, at least first of the plurality of domains comprises a source domain with label information for the data of the source domain and at least a second of the plurality of domains comprises a target domain. In one example, the performing the cross domain inference includes training a machine learning model, such as a multi-class classifier (e.g., a SVM), with the output of the sparse coding and performing a classification, e.g., classifying additional data from the target domain with the machine learning model. In another example, the performing the cross domain inference may include clustering the output of the sparse coding into an additional plurality of clusters, e.g., when no label data is available. In such an example, step 290 may further include the processor training a SVM or other type of machine learning model with the plurality of additional clusters, and classifying additional data from the target domain with the machine learning model. In one example, a number of the additional plurality of clusters is selected based upon a classification accuracy of a SVM or other type of machine learning model. For instance, when no label data is available, the number of categories of the data may be empirically determined by adjusting the number of clusters to maximize an accuracy of the classifications provided via the support vector machine. In still another example, at least first of the plurality of domains comprises a source domain, at least a second of the plurality of domains comprises a target domain, and a number of the additional plurality of clusters is selected based upon a number of categories in the target domain that do not appear in the source domain. For instance, the method 200 may also be used for zero-shot learning where there are categories in the target domain that do not appear in the source domain(s). Following step 290, the method 200 proceeds to step 295 where the method ends.

It should be noted that the method 200 may be expanded to include additional steps or may be modified to include additional operations with respect to the steps outlined above. For example, the method 200 may be repeated with new training data to update the corpus of information and to retrain a machine learning model (e.g., a multi-class classifier), and to perform inferences (e.g., classification) with respect to new data from the target domain(s). In one example, step 290 may include the training of a machine learning model, which may then be deployed "live" to perform its designated inference task, e.g., by the processor performing the method 200 or within another device, such as within a network traffic processing server, within a server or other computing device for image processing tasks, within a call center server, and so forth. However, optional step 210 and steps 220-280 may be performed "offline," which in accordance with the present disclosure may comprise functions that are performed on a separate device, functions that are performed during times that the processor, data storage devices, network, and/or other resources are idle or have loads that are below certain levels, and so forth. Thus, these and other modifications are all contemplated within the scope of the present disclosure.

In addition, although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted either on the device executing the method 200, or to another device, as required for a particular application. Furthermore, steps, blocks, functions, or operations in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the examples of the present disclosure.

As such, the present disclosure provides at least one advancement in the technical field of machine learning models for network traffic classification, digital image processing, and so forth. This is in contrast to traditional approaches of distance transforms, spectral mapping, and manifold alignment. For instance, faster and more accurate inferences of machine learning models may be provided via examples of the present disclosure that utilize parallel transport and sparse coding in connection with heterogeneous domains/data sources relating to similar types of data, but with different feature sets. In turn, processor resources and/or network bandwidth resources may be conserved or made available for other tasks.

The present disclosure also provides a transformation of data, e.g., a training data set is transformed into a corpus of information that includes learned domain shifts and which includes pertinent information for reasoning out new categories. In addition, in one example a machine learning model is generated in accordance with the corpus of information, thereby further transforming the data. In addition, new data is generated insofar as examples of the present disclosure may provide classification results or other inferences in accordance with a machine learning model generated as described above. For instance, new photographs with unknown subject matter may be categorized and then labeled in accordance with a category that is determined, new uncategorized network traffic may be classified/categorized/labeled, and then stored, forwarded, routed, or otherwise processed in accordance with the category that is determined.

Finally, examples of the present disclosure improve the functioning of a computing device, e.g., a server. Namely, a server deployed in a telecommunication service provider network is improved via the operations of the present disclosure to generate a corpus of information using parallel transport and sparse coding, to train a machine learning model with the corpus of information, and to perform cross-domain inferences on new data from one or more target domains in accordance with the machine learning model, such as by performing network traffic classification functions and/or firewall functions that are improved via a machine learning model that accounts for heterogeneous data types/domains in accordance with the present disclosure. Furthermore, the telecommunication service provider network is also transformed via the automatic adjustment of parameters for generating the corpus of information using parallel transport and sparse coding, and/or for generating a machine learning model, in accordance with examples of the present disclosure.

Figure 3:
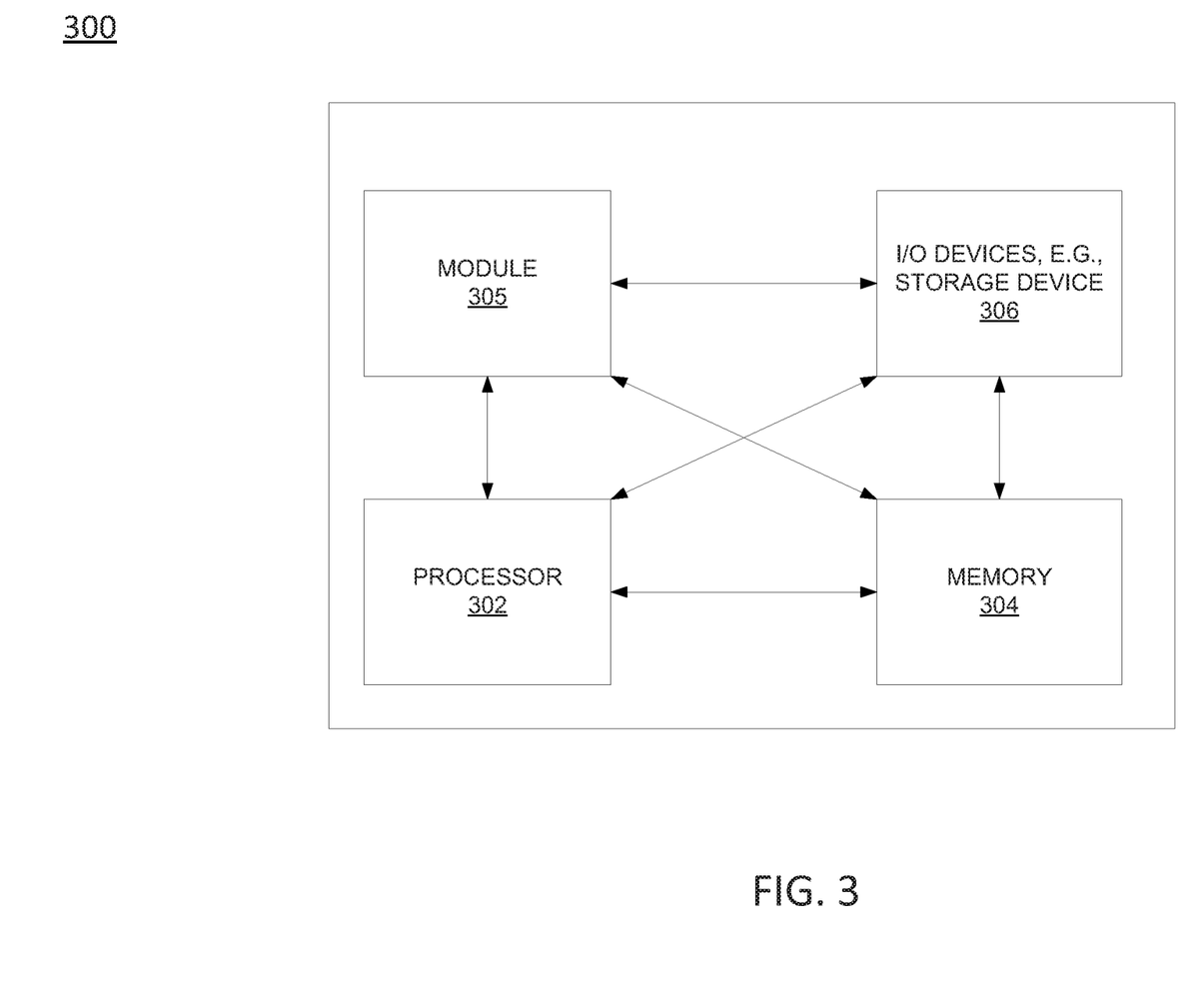
FIG. 3 illustrates a high-level block diagram of a computing device specially programmed to perform the functions described herein.

FIG. 3 depicts a high-level block diagram of a computing device specifically programmed to perform the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for performing a cross domain inference using parallel transport and sparse coding, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 302 can also be configured or programmed to cause other devices to perform one or more operations as discussed above. In other words, the one or more hardware processors 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 305 for performing a cross domain inference using parallel transport and sparse coding (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for performing a cross domain inference using parallel transport and sparse coding (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
    a processor;
    a computer-readable medium storing instructions which, when executed by the processor, cause the processor to perform operations, the operations comprising:
        performing a parallel transport between a first set of a plurality of generative subspaces and a second set of the plurality of generative subspaces, wherein the performing the parallel transport identifies a set of directions between pairs of subspaces of the first set of the plurality of generative subspaces and subspaces of the second set of the plurality of generative subspaces;
        sampling a plurality of points along the set of directions via an exponential mapping, wherein the plurality of points comprises a plurality of intermediate representations;
        projecting data from the first set of the plurality of generative subspaces and the second set of the plurality of generative subspaces to the plurality of intermediate representations to create an expanded set of prior information;
        performing a sparse coding with an input data matrix and the expanded set of prior information; and
        performing a cross domain inference using an output of the sparse coding.

2. The device of claim 1, the operations further comprising:
    generating a plurality of initial subspaces by reducing data of each of a plurality of domains to a same dimensionality;
    clustering the data within each of the plurality of initial subspaces into a plurality of clusters; and
    creating the input data matrix by projecting the data from each of the plurality of clusters to an associated one of the plurality of generative subspaces that is associated with the plurality of clusters.

3. The device of claim 2, wherein the first set of the plurality of generative subspaces is associated with at least two of the plurality of the domains.

4. The device of claim 2, wherein the second set of the plurality of generative subspaces is associated with at least two of the plurality of the domains.

5. The device of claim 2, wherein the generating the plurality of initial subspaces comprises:
    performing a principal component analysis for each of the plurality of domains to generate the plurality of initial subspaces; and
    projecting the data from each of the plurality of domains to an associated one of the plurality of initial subspaces.

6. The device of claim 2, wherein the same dimensionality is selected as a largest dimensionality associated with the plurality of initial subspaces that preserves a threshold percentage of signal energy of the data of each of the plurality of domains.

7. The device of claim 2, wherein the plurality of generative subspaces is generated via a principal component analysis over the plurality of clusters.

8. The device of claim 7, wherein the principal component analysis over the plurality of clusters reduces the same dimensionality of the plurality of initial subspaces to a largest dimensionality associated with the plurality of initial subspaces that preserves a threshold percentage of signal energy of the data of each of the plurality of clusters.

9. The device of claim 1, wherein a dictionary for the sparse coding is initialized with the expanded set of prior information.

10. The device of claim 2, wherein at least a first one of the plurality of domains comprises a source domain with label information for the data of the source domain, wherein at least a second one of the plurality of domains comprises a target domain, and wherein the performing the cross domain inference comprises:

training a multi-class support vector machine with the output of the sparse coding performing a classification; and classifying additional data from the target domain with the multi-class support vector machine.

11. The device of claim 10, wherein the sparse coding comprises a discriminative sparse coding using the label information for the data of the source domain.

12. The device of claim 10, wherein the clustering the data within each of the plurality of initial subspaces into the plurality of clusters utilizes the label information to differentiate the plurality of clusters.

13. The device of claim 2, wherein the performing the cross domain inference comprises:

clustering the output of the sparse coding into an additional plurality of clusters;

training a multi-class support vector machine with the additional plurality of clusters; and classifying additional data from a target domain with the multi-class support vector machine.

14. The device of claim 13, wherein a number of the additional plurality of clusters is selected based upon a classification accuracy of the multi-class support vector machine.

15. The device of claim 13, wherein at least a first one of the plurality of domains comprises a source domain, wherein at least a second one of the plurality of domains comprises the target domain, and wherein a number of the additional plurality of clusters is selected based upon a number of categories in the target domain that do not appear in the source domain.

16. The device of claim 1, wherein the performing the cross domain inference comprises:

an object recognition;

a text classification;

a sentiment analysis; or an event classification.

17. The device of claim 1, wherein the sparse coding comprises a hierarchical sparse coding.

18. The device of claim 1, wherein the sampling the plurality of points along the set of directions comprises a uniform sampling.

19. A method comprising:

performing, by a processor, a parallel transport between a first set of a plurality of generative subspaces and a second set of the plurality of generative subspaces, wherein the performing the parallel transport identifies a set of directions between pairs of subspaces of the first set of the plurality of generative subspaces and subspaces of the second set of the plurality of generative subspaces;

sampling, by the processor, a plurality of points along the set of directions via an exponential mapping, wherein plurality of the points comprises a plurality of intermediate representations;

projecting, by the processor, data from the first set of the plurality of generative subspaces and the second set of the plurality of generative subspaces to the plurality of intermediate representations to create an expanded set of prior information;

performing, by the processor, a sparse coding with an input data matrix and the expanded set of prior information; and performing, by the processor, a cross domain inference using an output of the sparse coding.

20. A non-transitory computer-readable storage medium storing instructions which, when executed by a processor, cause the processor to perform operations, the operations comprising:

performing a parallel transport between a first set of a plurality of generative subspaces and a second set of the plurality of generative subspaces, wherein the performing the parallel transport identifies a set of directions between pairs of subspaces of the first set of the plurality of generative subspaces and subspaces of the second set of the plurality of generative subspaces;

sampling a plurality of points along the set of directions via an exponential mapping, wherein the plurality of points comprises a plurality of intermediate representations;

projecting data from the first set of the plurality of generative subspaces and the second set of the plurality of generative subspaces to the plurality of intermediate representations to create an expanded set of prior information;

performing a sparse coding with an input data matrix and the expanded set of prior information; and performing a cross domain inference using an output of the sparse coding.

* * * * *